United States Patent [19]

Drever

[11] Patent Number: 5,454,042

[45] Date of Patent: Sep. 26, 1995

[54] AUDIO-VIDEO SOURCE BOOM SUPPORT ASSEMBLY HAVING IMPROVED ARTICULATION CAPABILITY

[76] Inventor: Leslie Drever, 7760 Burnet Ave., Van Nuys, Calif. 91405

[21] Appl. No.: 114,264

[22] Filed: Aug. 30, 1993

Related U.S. Application Data

[63] Continuation-in-part of Ser. No. 684,616, Apr. 12, 1991.

[51] Int. Cl.⁶ .................................................. H04R 25/00
[52] U.S. Cl. ............................................ 381/169; 381/205
[58] Field of Search ................................... 381/169, 205, 381/91, 87, 122, 168; 224/185, 200, 204; 248/176; 352/24; 354/81, 82, 70; 358/906, 335; 348/373, 207

[56] References Cited

U.S. PATENT DOCUMENTS

| | | | |
|---|---|---|---|
| 2,122,778 | 7/1938 | Mueller | 381/169 |
| 2,235,518 | 3/1941 | Goshaw | 381/91 |
| 2,421,437 | 6/1947 | Ryan et al. | 381/169 |
| 4,206,983 | 6/1980 | Nettman et al. | 352/243 |

FOREIGN PATENT DOCUMENTS

| | | | |
|---|---|---|---|
| 0996787 | 2/1983 | U.S.S.R. | 248/176 |

OTHER PUBLICATIONS

"The Traveling Mike", N. H. Crowhurst, Audio Engineering, Feb. 1952.

*Primary Examiner*—Curtis Kuntz
*Assistant Examiner*—Huyen D. Le
*Attorney, Agent, or Firm*—John J. Posta, Jr.

[57] ABSTRACT

An audio-video boom for use in suspending and positioning a camera and/or a microphone is disclosed which has dual wide degrees of articulation capability to facilitate accurate and precise camera and/or microphone orientation while requiring only a single audio-video boom operator. The improved audio/video boom has a first driving member which may be operated to pan (rotate or pivot) a camera and/or a microphone at the end of the audio/video boom via a first pair of cables driving a first driven member which pans the camera and/or a microphone. The audio/video boom also has a second driving member which may be operated to tilt the camera and/or the microphone via a second pair of cables driving a second driven member which tilts the camera and/or the microphone. A support apparatus may be used to support the audio/video boom from a harness worn by the microphone boom operator, with the camera and/or the microphone being adjustable by panning, swiveling, axially rotating, and selectively panning and/or tilting the camera and/or the microphone at the end of the audio/video boom.

24 Claims, 5 Drawing Sheets

AUDIO-VIDEO SOURCE BOOM SUPPORT ASSEMBLY HAVING IMPROVED ARTICULATION CAPABILITY

This application is a continuation-in-part of U.S. patent application Ser. No. 07/684,616, filed on Apr. 12, 1991, and entitled "Microphone Boom Assembly With Improved Articulation Capability."

BACKGROUND OF THE INVENTION

Field of the Invention

The present invention relates generally to a boom for suspending and positioning a small camera such as a video camera and/or a microphone, and more particularly to an improved audio/video boom having a wide degree of articulation capability to facilitate accurate and precise camera and/or microphone orientation while requiring only a single audio/video boom operator.

The Necessity for Microphone Booms

For as long as there have been motion pictures with soundtracks which include dialogue, and additionally in the medium of television, it has been necessary to properly position one or more microphones to capture the sound of a person speaking. Sound (and more particularly dialogue) recording has become quite sophisticated over the years, with improvements being made notably in the electronics which may be used in the art. Although some television productions use wireless microphones mounted on the person of the speaker, most microphones are still mounted on a boom located over the scene being filmed or broadcast.

With all of the sophisticated electronics now available, the art of recording dialogue still requires that the microphone be positioned both as close to the speaker as is possible, and in a proper orientation, since most microphones used are highly directional. Of course, the other limitation is that the microphone must be located out of view of the camera, over the scene being filmed or broadcast. Thus, a microphone boom must be manipulated to move the microphone as the speaker moves, or as different speakers speak in turns. Accordingly, the microphone boom is used both to support and to aim the microphone (or microphones) located at the end of the boom.

The Necessity of Camera Booms

An additional but related problem is the support of a camera used to capture pictures, which camera may or may not include one or more microphones. Such cameras must be positioned and oriented as precisely toward the event to be recorded as is possible. While the problem of supporting heavy motion picture cameras and full sized television cameras has been addressed adequately by the art, the new small video cameras and camcorders present additional possibilities not possible with a heavy, full-size camera unit. Small cameras weighing only a few pounds have proliferated in the recent past, and small video cameras and camcorders are increasingly utilized in day-to-day news coverage.

A Brief History of the Art With Regard to Microphone Booms

Two basic types of microphone booms have long been used in motion picture and television production. The first of these microphone booms is a hand-held boom often referred to as a "fishpole" boom, which is relatively simple both in design and in use. The other type of microphone boom in wide use today is a production studio boom, which is a complex, delicate, and expensive instrument which is suitable for use only in a studio environment.

A hand-held or fishpole boom is physically held and guided by a single person (the boom operator). A microphone is mounted at one end of the boom in a fixed angular position, with the other end of the boom being manipulated by the boom operator to position and orient the microphone. The hand-held boom has the advantages of being relatively simple to operate and fast to manipulate in the hands of a skilled operator. It will fit into tight spaces, and is essentially not limited by the required distance of movement, since the operator may move as well as moving the boom. It is rugged and highly portable, as well as being of relatively inexpensive construction, and is in world-wide use.

The primary weakness of the hand-held boom is that the microphone is fixed at a predetermined angle, which can only be changed by interrupting the filming or taping sequence. Only crude sideways cueing is possible by twisting the boom, and alternating forward and rearward aiming is only possible by bringing the boom around in a 90 degree arc, which is not very practical. With complex work, two or more booms must be used, which means that two or more operators will be necessary as well. Even with a single boom and microphone, some movements must be coordinated, requiring for example a second operator to look after the trailing microphone cables. In addition, the hand-held boom becomes tedious to support by hand over a period of time, particularly when the boom is being used with a heavy directional microphone.

The other type of microphone boom in wide use is the production studio boom, which has a telescoping boom mounted on a support mast extending vertically from a carriage. The microphone is mounted at the end of the telescoping boom, and may be rotated (typically in a single direction) beneath the end of the telescoping boom. The telescoping boom may be varied in length to telescope the microphone forward and backward. The entire telescoping boom may be panned and tilted (see-sawed).

The operation of the production studio boom is complex and difficult. While it is suitable for use on the average soundstage, there are quite definite limits on its performance which can only be overcome by using two or more operators to control a single production studio boom. Since operation of the telescoping boom must be quiet so as to not generate noise which will be picked up by the microphone, the rubber roller mechanism typically used requires extensive expert maintenance to keep it operating quietly. In addition, the telescoping boom may rotate about its axis, which will degrade rotational control of the microphone.

A Brief History of the Art With Regard to Camera Booms

Production studio booms have been used almost exclusively to support cameras, except for small cameras, which have been supported with conventional tripods. One significant exception has been in the field of television news, where on-the-spot coverage is afforded by small hand-held cameras. A common problem in such use is the presence of crowds or other obstructions, which may impede a clear field of view for the camera. However, that field of view would generally be clear if the camera could be lifted above the crowd or other obstruction. Thus, an audio/video boom would necessarily have to be capable of being manipulated to move the camera in the manner that a cameraman would if he was holding and aiming the camera itself.

While with microphones only a single degree of movement is generally required (the ability to pan), with cameras two degrees of movement are virtually always required. In addition to the ability to pan, cameras also require the ability to tilt up and down relative to their support mechanism. Unfortunately, there are no currently usable audio/video booms which provide both support and the ability to maneuver a camera located at the end of the boom in two independent degrees of movement.

It is accordingly the primary objective of the present invention that it provide an audio/video boom which may be both carried and operated by a single operator, yet which may be articulated to a degree equaling or exceeding the operation of a production studio boom. It is an objective of the present invention that it provide a degree of rotational or pivotal movement about an axis fixed with respect to the end of the boom on which a camera and/or a microphone is mounted.

It is another primary objective of the present invention that it provide an audio/video boom having a second degree of movement in addition to the first degree of movement mentioned above. Thus, it is an objective that the present invention provide an audio/video boom having a degree of tilting movement about an axis fixed with respect to the end of the boom on which a camera and/or a microphone is mounted. This second degree of movement must allow a camera and/or a microphone to be simultaneously, independently tilted in addition to the first degree of movement which allows it/them to be panned.

It is an additional objective of the present invention that both of the panning and tilting movements of the camera and/or the microphone at the end of the boom be easy to accomplish and control, and that it be implemented with a high degree of precision. It is a further objective of the present invention that it be of light weight, and that it provide means for support to prevent the operator from having to support by hand the audio/video boom of the present invention over an extended period of time. It is also an objective that the audio/video boom of the present invention be of adjustable yet substantial length to support a camera and/or a microphone from a remote location.

It is a still further objective of the present invention that the audio/video boom operate in a totally silent manner so as not to interfere with sound being recorded. In addition to being lightweight, portable, and easy to operate, the audio/video boom of the present invention should also be durable and require little maintenance, yet be of inexpensive construction to afford it the broadest possible market. Finally, it is also an objective that all of the aforesaid advantages and objectives of the audio/video boom of the present invention be achieved without incurring any substantial relative disadvantage.

SUMMARY OF THE INVENTION

The disadvantages and limitations of the background art discussed above are overcome by the present invention. With this invention, a lightweight, collapsible boom arm is made either of a single section or of a number of sections which may be extended or retracted to the preferred working length of the audio/video boom. In the multi-section embodiment, the sections may be locked together to prevent extension or retraction by actuating a locking mechanism, which in the preferred embodiment is a threaded locking collar of a type well known in the art. For additional length, further extensions may also optionally be utilized.

Located at the far end of the boom arm is a camera and/or microphone support mechanism. The audio/video boom of the present invention supports a camera and/or a microphone for controlled movement about dual axes with respect to the end of the boom arm. The dual degrees of movement allowed by the support mechanism are independent, simultaneous panning and tilting of a camera and/or a microphone located under the end of the boom arm.

Located toward the other end of the boom arm, and supported under the boom arm in rotatable fashion, is a first drive mechanism which is mechanically coupled to pan the camera and/or the microphone located at the end of the boom arm. The first drive mechanism has a grip which may be rotated to drive the panning movement of the camera and/or the microphone. In the preferred embodiment, the first drive mechanism is a grooved pulley operating cables which drive a smaller grooved pulley located at the end of the boom arm. Thus, movement of the larger grooved pulley caused by movement of the grip causes corresponding movement of the smaller grooved pulley, which pans the camera and/or the microphone. The first drive mechanism may be optionally designed to allow for different boom arm lengths between the drive mechanism and the end of the boom arm having the camera and/or the microphone mounted thereon.

Located at an intermediate portion of the boom arm, and optionally supported on the boom arm in rotatable fashion, is a second drive mechanism which is mechanically coupled to tilt the camera and/or the microphone located at the end of the boom arm. The second drive mechanism has a lever which may be rotated to drive the tilting movement of the camera and/or the microphone. In the preferred embodiment, the second drive mechanism is a grooved pulley operating cables which are fed over two intermediate pulleys to drive a smaller grooved pulley located at the end of the boom arm. Thus, movement of the larger grooved pulley caused by movement of the lever causes corresponding movement of the smaller grooved pulley, which tilts the camera and/or the microphone. The second drive mechanism may optionally also be designed to allow for different boom arm lengths between the drive mechanism and the end of the boom arm having the camera and/or the microphone mounted thereon.

Thus, the audio/video boom of the present invention offers a combination of features heretofore found in neither the hand-held (fishpole) boom or the production studio boom. For example, the panning and tilting movement of the camera and/or the microphone can be independently and simultaneously implemented, a combination not found in the art.

The preferred embodiment of the present invention also adds an additional embellishment in the form of a support mechanism for removing a substantial portion of the load from the arms of the audio/video boom operator. In this preferred embodiment, a support mast is movably mounted on a harness worn by the audio/video boom operator. This harness may be a belt with a shoulder strap, with the base of the support mast being mounted in a universal joint supported by the harness. The support mast is connected at the top thereof to support the boom arm at a location intermediate the length of the boom arm.

In the preferred embodiment, the support mast has an adjustable height, with a gas-filled strut being used to easily adjust the height of the boom arm. The top of the support mast may be coupled to the drive mechanism to support the boom arm. The support mast allows the boom arm to be panned and tilted (see-sawed) therefrom. If desired, a ballast weight may be added to the end of the boom arm opposite the end at which the camera and/or the microphone is mounted.

It may therefore be seen that the present invention teaches an audio/video boom which can be both carried and operated by a single operator, yet which can be articulated to a degree equaling or exceeding the operation of a production studio boom. The audio/video boom of the present invention provides a degree of rotational or pivotal movement about an axis fixed with respect to the end of the boom on which a camera and/or a microphone is mounted.

This degree of either rotational or pivotal movement by itself allows the audio/video boom of the present invention to be used with either of two different microphone types. In addition, this degree of rotational or pivotal movement is usable in conjunction with axial rotation (twisting) of the boom of the present invention to direct a microphone, which was not possible with a production studio boom. This embodiment which is for use primarily with microphones was the subject of the parent case mentioned above.

The present invention also provides an audio/video boom with a second degree of movement in addition to the first degree of movement mentioned above. This second degree of movement is a degree of tilting movement about an axis fixed with respect to the end of the boom on which a camera and/or a microphone is mounted. The second degree of movement allows a camera and/or a microphone to be simultaneously, independently tilted in addition to the first degree of movement which allows it/them to be panned.

Both panning movement and tilting movement of the camera and/or the microphone at the end of the boom is easy to accomplish and control, and it is implemented with a high degree of precision. The audio/video boom of the present invention is light in weight, and it provides means for supporting the audio/video boom to prevent the operator from having to support by hand the boom of the present invention over an extended period of time. The audio/video boom of the present invention is also of adjustable yet substantial length to support a camera and/or a microphone from a remote location.

The audio/video boom of the present invention operates in a totally silent manner so as not to interfere with sound being recorded. In addition to being lightweight, portable, and easy to operate, the audio/video boom of the present invention is also durable and requires little maintenance, yet is of inexpensive construction to afford it the broadest possible market. Finally, all of the aforesaid advantages and objectives of the present invention are achieved without incurring any substantial relative disadvantage.

DESCRIPTION OF THE DRAWINGS

These and other advantages of the present invention are best understood with reference to the drawings, in which.

DETAILED DESCRIPTION OF THE PREFERRED EMBODIMENT

The preferred embodiment of the present invention utilizes a novel operating mechanism to help articulate a camera and/or a microphone located at the end of a boom arm. This operating mechanism includes first and second drive mechanisms and first and second driven mechanisms, with the drive mechanisms being manipulated by the audio/video boom operator and the driven mechanisms being driven by their respective drive mechanisms to manipulate a camera and/or a microphone. The driven mechanisms are located at one end of the boom arm, and the drive mechanisms are located intermediate the ends of the boom arm.

FIGS. 1 through 15 illustrate the embodiment claimed in the parent case first identified above. This embodiment affords a single degree of movement to a microphone mounted at the end of the boom arm. This degree of movement is a panning movement. FIGS. 16 through 20 build on FIGS. 1 through 15 and add second drive and driven mechanisms, components of which may be similar to the components of the first drive and driven mechanisms. The embodiment of FIGS. 16 through 20 add a second degree of movement, namely a tilting movement. It is the embodiments of FIGS. 16 through 20 which are the subject matter of the present invention, although the embodiment of FIGS. 16 through 20 may also be embellished with optional features shown and discussed herein.

Figure 1:
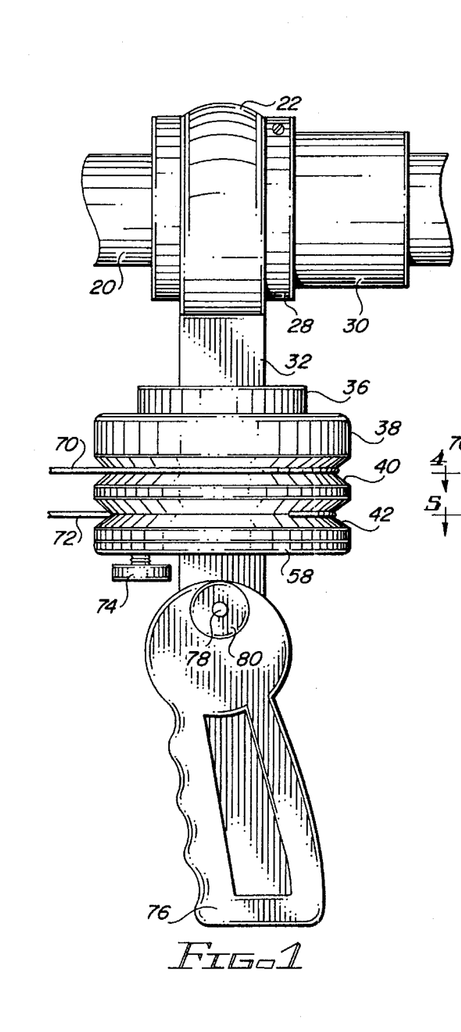
FIG. 1 is a side plan view of the first, panning drive mechanism showing the large grooved pulley which is used to operate two cables, the rotatable attachment of the drive mechanism on a segment of the boom arm, and the grip used to operate the drive mechanism.
Figure 2:
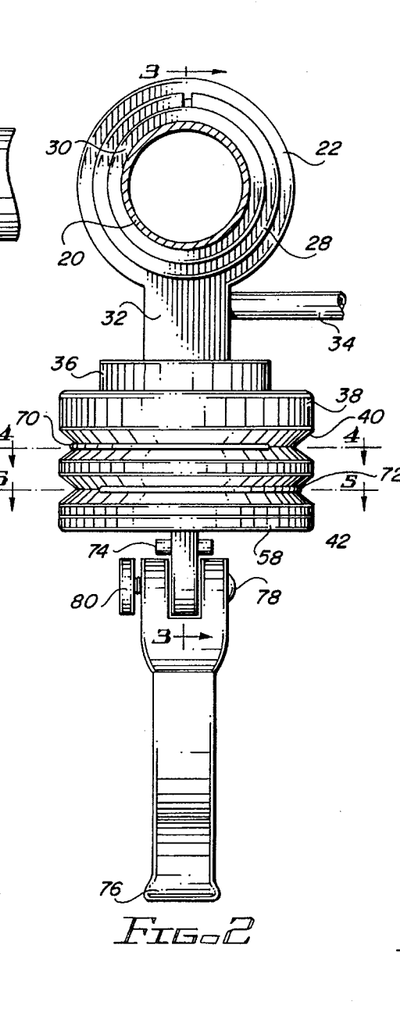
FIG. 2 is a back view of the first drive mechanism shown in FIG. 1, showing the connection of a holding shaft to the drive mechanism, which holding shaft is used to support the boom arm.
Figure 3:
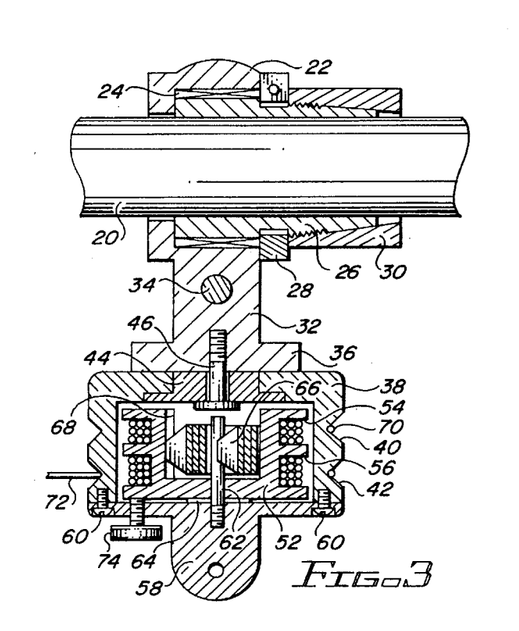
FIG. 3 is a partial sectional view showing the interior of the first drive mechanism including the cable take-up reel, the take-up spring, and the locking mechanism used to lock the cable take-up reel to the large grooved pulley.

Referring first to FIGS. 1 through 3, the first drive mechanism is illustrated mounted onto a boom arm 20. Referring especially to FIG. 3, the first drive mechanism is mounted onto the boom arm 20 using a lock tube housing 22, which includes a cylindrical interior. Located inside the lock tube housing 22 is a radial bearing 24, which supports the lock tube housing 22 for rotation about the boom arm 20. Located partially inside the radial bearing 24 and extending out the rear of the lock tube housing 22 is a slotted lock tube 26 having a tapered end extending toward the rear (the right of FIG. 3).

A split locking collar 28 is used to retain the slotted lock tube 26 and the radial bearing 24 inside the cylindrical interior of the lock tube housing 22. A locking collar 30 having a mating tapered portion therein is screwed onto the rear of the slotted lock tube 26 to lock it into position on the boom arm 20. The locking collar 30 thus is used to adjust the longitudinal position of the lock tube housing 22 on the boom arm 20. Even when locked in longitudinal position on the boom arm 20, the lock tube housing 22 is free to rotate around the boom arm 20 (and the boom arm 20 thus is free to rotate within the lock tube housing 22).

Referring again to FIGS. 1 through 3, a neck 32 extends from the bottom of the lock tube housing 22. A holding shaft 34 extends from the right side of the neck 32, as best shown in FIG. 2. The holding shaft 34 is essentially tangential with respect to the boom arm 20. Located under the neck 32 is a circular flange 36.

A large grooved pulley 38 has two spaced-apart V-shaped circular grooves 40 and 42 therein. The V-shaped circular groove 40 is located nearer the top of the large grooved pulley 38 (as shown in the figures), and the V-shaped circular groove 42 is located nearer the bottom of the large grooved pulley 38. Referring now particularly to FIG. 3, the large grooved pulley 38 has a cylindrical aperture therein, and is open on the bottom thereof, as well as having an aperture in the top thereof.

A bearing 44 is press fitted into the top of the large grooved pulley 38, and a bolt 46 is inserted from the bottom of the bearing 44 and screwed into the bottom of the circular flange 36 and the neck 32. The large grooved pulley 38 thus rotates freely under the circular flange 36.

Figure 4:
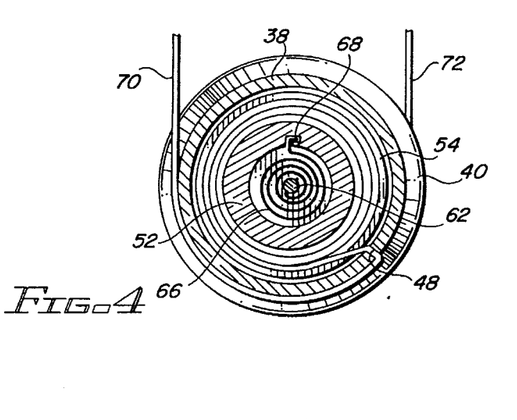
FIG. 4 is a cross-sectional view showing the portion of the first drive mechanism (including the cable take-up reel) for storing and operating one of the cables.
Figures 5, 6, 7, 8, 9, 10, 11:
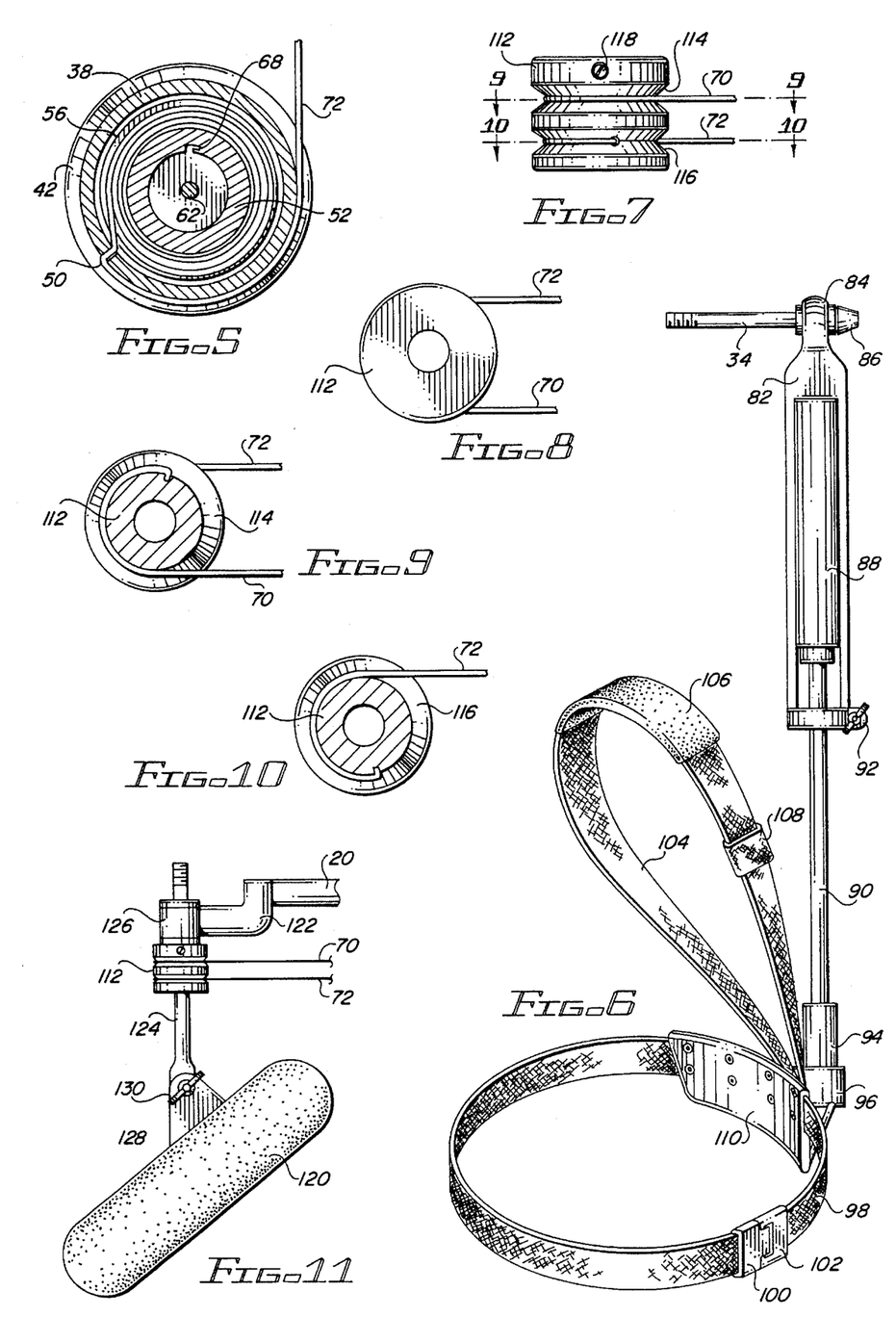
FIG. 5 is a cross-sectional view showing the portion of the first drive mechanism (including the cable take-up reel) for storing and operating the other of the cables.
FIG. 6 is a partially perspective view of the support mechanism used to support the boom arm from the audio/video boom operator's body, including a harness for mounting on the audio/video boom operator's body, a support mast, and the holding shaft.
FIG. 7 is a side view of the small grooved pulley which will be driven by the cables from the large grooved pulley shown in FIG. 1.
FIG. 8 is a top view of the small grooved pulley shown in FIG. 7.
FIG. 9 is a cross-sectional view showing the portion of the small grooved pulley for connection to one of the cables.
FIG. 10 is a cross-sectional view showing the portion of the small grooved pulley for connection to the other of the cables.
FIG. 11 is a side view of the first driven mechanism located at the end of the boom arm for supporting the first type of microphone, with the small grooved pulley shown in FIGS. 7 through 10 being used to rotate the microphone.

Referring now to FIG. 4, note that the large grooved pulley 38 has an aperture 48 extending therethrough in communication with the V-shaped circular groove 40. Referring to FIG. 5, note that the large grooved pulley 38 has an aperture 50 extending therethrough in communication with the V-shaped circular groove 42.

Referring now to FIGS. 3 through 5, a cable take-up reel 52 having an outer diameter slightly less than the diameter of the cylindrical aperture in the large grooved pulley 38 is located in the cylindrical aperture in the large grooved pulley 38. The cable take-up reel 52 has two spaced-apart annular recesses 54 and 56 located in the outer diameter thereof, with the annular recess 54 being located above the annular recess 56. The cable take-up reel 52 also has a cylindrical aperture located in the top thereof.

Referring again to FIG. 3, a pulley base 58 is located under the large grooved pulley 38 to enclose the bottom thereof. A plurality of bolts 60 are used to retain the pulley base 58 on the bottom of the large grooved pulley 38. A pin 62 is screwed into the top of the pulley base 58 in the center thereof, and a bearing washer 64 is mounted on the pin 62. The cable take-up reel 52 is rotatably mounted on the pin 62 over the bearing washer 64.

Referring now to FIGS. 3 through 5, a constant force spring 66 is mounted within the cylindrical aperture in the top of the cable take-up reel 52. One end of the constant force spring 66 is attached to the pin 62 through a slot therein. The other end of the constant force spring 66 is attached to a slot 68 in the cable take-up reel 52.

A first cable 70 is wound onto the annular recess 54 in the cable take-up reel 52. An end of the first cable 70 extends through the aperture 48 in the V-shaped circular groove 40 in the large grooved pulley 38, and around the V-shaped circular groove 40 in a first direction to the front. A second cable 72 is wound onto the annular recess 56 in the cable take-up reel 52. An end of the second cable 72 extends through the aperture 50 in the V-shaped circular groove 42 in the large grooved pulley 38, and around the V-shaped circular groove 42 in a second direction opposite the first direction to the front.

The constant force spring 66 is wound to cause the first and second cables 70 and 72 to be drawn into the interior of the large grooved pulley 38 around the cable take-up reel 52. Thus, the first and second cables 70 and 72 may be pulled out of the large grooved pulley 38 in equal lengths, winding the constant force spring 66. The wound constant force spring 66 will then tend to draw the extended portions of the first and second cables 70 and 72 back into the large grooved pulley 38 and around the cable take-up reel 52.

Referring now to FIG. 3, located in the bottom of the pulley base 58 near the front side thereof is a locking knob 74, which when tightened will bear on the bottom of the cable take-up reel 52. When the length of the first and second cables 70 and 72 are as desired, the locking knob 74 is tightened to prevent relative movement between the cable take-up reel 52 and the large grooved pulley 38. This will secure the lengths of the first and second cables 70 and 72 at whatever length they are at when the locking knob 74 is tightened.

It will be understood that when the large grooved pulley 38 is rotated in a first direction, a portion of the first cable 70 will be unwound from the V-shaped circular groove 40 of the large grooved pulley 38, and a portion of the second cable 72 will be wound onto the V-shaped circular groove 42 of the large grooved pulley 38. Similarly, when the large grooved pulley 38 is rotated in a second direction opposite the first direction, a portion of the first cable 70 will be wound onto the V-shaped circular groove 40 of the large grooved pulley 38, and a portion of the second cable 72 will be unwound from the V-shaped circular groove 42 of the large grooved pulley 38.

Referring now to FIGS. 1 and 2 again, it may be seen that a handle 76 is mounted on the bottom of the pulley base 58 using a bolt 78 and a locking knob 80. The handle 76 is moveable with respect to the pulley base 58. When the handle 76 is in its desired position with respect to the pulley base 58, the locking knob 80 is tightened to fix the handle 76 in place. In the preferred embodiment, the handle 76 is contoured as shown to be gripped by a hand.

Referring next to FIG. 6, the apparatus for supporting the boom arm 20 is illustrated. The apparatus shown in FIG. 6 will be attached to the holding shaft 34, which as described above is connected at one end to the neck 32, which supports the lock tube housing 22, in which the boom arm 20 is located (FIG. 1).

An upper mast member 82 has a radial bearing member 84 mounted at the top thereof. The end of the holding shaft 34 not attached to the neck 32 (FIG. 1) is installed in the radial bearing member 84, where it is retained by a locking nut 86. The holding shaft 34 is thus pivotally mounted on the upper mast member 82, allowing the boom arm 20 (FIG. 1) to tilt or see-saw.

Mounted in the upper mast member 82 is a pneumatic strut cartridge 88, from the bottom of which extends a lower mast member 90. The lower mast member 90 may move partially into and out of the pneumatic strut cartridge 88. The pneumatic strut cartridge 88 will assist in moving the lower mast member 90 upwardly with respect to the lower mast member 90. Thus, the pneumatic strut cartridge 88 will assist in lifting the load carried by the upper mast member 82, which of course includes the boom arm 20 (FIG. 1). Located at the bottom of the upper mast member 82 is a locking clamp 92, which may be used to lock the lower mast member 90 in a fixed position relative to the upper mast member 82 and the pneumatic strut cartridge 88.

The bottom of the lower mast member 90 extends through a pliable universal joint 94 mounted on a mast holder 96. The bottom of the lower mast member 90 (not shown) preferably has a ball member mounted in a socket (not shown) located in the mast holder 96. The lower mast member 90 is thus mounted via the pliable universal joint 94 to the mast holder 96 in a manner allowing the holding shaft 34 (and thus the boom arm 20 of FIG. 1) to be panned. In the preferred embodiment, the lower mast member 90 fits into the mast holder 96 in a quick install/quick release configuration.

The mast holder 96 is mounted onto the side of a hip belt 98, which has the engaging fastening members 100 and 102 mounted thereon for use in installing and removing the hip belt 98 around the hips of a wearer. A shoulder strap 104 has both ends thereof attached to the hip belt 98 near the location of the mast holder 96 thereon. The shoulder strap 104 has a shoulder pad 106 located thereon, and a length adjusting device 108 installed therein. Located on the inside of the hip belt 98 just behind the location of the mast holder 96 is a plastic reinforcing segment 110.

Referring next to FIGS. 7 through 10, a small grooved pulley 112 is illustrated. The small grooved pulley 112 will be the driven member, driven by the driving mechanism discussed above in conjunction with FIGS. 1 through 5. The small grooved pulley 112 has two spaced-apart V-shaped circular grooves 114 and 116 therein. The V-shaped circular groove 114 is located nearer the top of the small grooved pulley 112 (as shown in FIG. 7), and the V-shaped circular groove 116 is located nearer the bottom of the small grooved pulley 112. Referring to FIG. 8, the small grooved pulley 112 has a cylindrical aperture therein. Referring now particularly to FIG. 7, the small grooved pulley 112 has a locking screw 118 installed therein, for use in locking the small grooved pulley 112 onto a shaft extending through the cylindrical aperture.

The small grooved pulley 112 is driven by the first and second cables 70 and 72. The first cable 70 extends around the V-shaped circular groove 114 of the small grooved pulley 112 in a first direction, and is fastened to the small grooved pulley 112. The second cable 72 extends around the V-shaped circular groove 116 of the small grooved pulley 112 in a second direction, and is fastened to the small grooved pulley 112.

It will be understood that when the second cable 72 is pulled and the first cable 70 is released, the small grooved pulley 112 will be rotated in a first direction, unwinding a portion of the first cable 70 from the V-shaped circular groove 114 of the small grooved pulley 112, and winding a portion of the second cable 72 onto the V-shaped circular groove 116 of the small grooved pulley 112. Similarly, when the first cable 70 is pulled and the second cable 72 is released, the small grooved pulley 112 will be rotated in a second direction opposite the first direction, winding a portion of the first cable 70 onto the V-shaped circular groove 114 of the small grooved pulley 112, and unwinding a portion of the second cable 72 from the V-shaped circular groove 116 of the small grooved pulley 112.

Referring now to FIG. 11, the use of the small grooved pulley 112 is illustrated on a driven mechanism for rotating a microphone 120 of the first type. A pulley holding bracket 122 is installed on the end of the boom arm 20. At the end of the pulley holding bracket 122, a shaft 124 is rotatably mounted in a bearing member 126. The shaft 124 extends from both the top and the bottom of the bearing member 126. The small grooved pulley 112 is mounted (using the locking screw 118) onto the shaft 124 under the bearing member 126.

A pivot member 128 mounted on the microphone 120 is attached to the bottom of the shaft 124 using a locknut 130. By releasing the locknut 130, the angle at which the microphone 120 is mounted on the shaft 124 may be adjusted. It will be appreciated by those skilled in the art that when the small grooved pulley 112 is rotated, the microphone 120 will also be rotated. Thus, the drive mechanism of FIGS. 1 through 5 may be used to rotate the microphone 120.

Figures 12, 13, 14, 15:
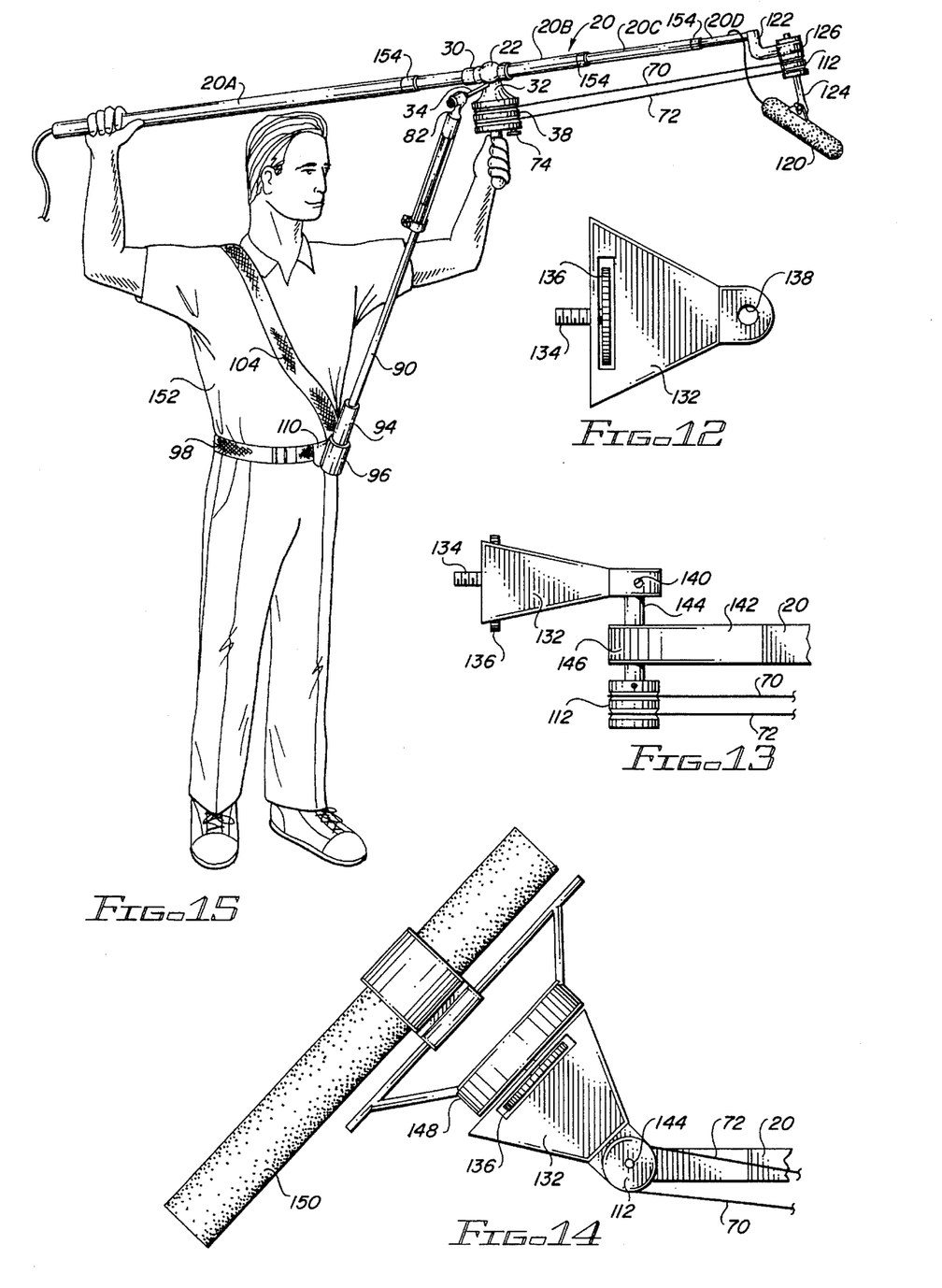
FIG. 12 is a side view of a support base for supporting the second type of microphone.
FIG. 13 is a top view of the support base shown in FIG. 12 mounted on a driven mechanism including the small grooved pulley shown in FIGS. 7 through 10 located at the end of the boom arm for supporting the second type of microphone.
FIG. 14 is a side view of the apparatus shown in FIG. 13, with a microphone suspension assembly being mounted on the support base shown in FIG. 12, and a microphone of the second type being mounted on the microphone suspension assembly.
FIG. 15 is a view showing the assembled audio/video boom in use by a audio/video boom operator to position a microphone of the first type.

Referring now to FIGS. 12 and 13, a support base 132 is illustrated which has a threaded stud 134 extending therefrom, which threaded stud 134 may be rotated by turning an adjustment wheel 136. The support base 132 has an aperture 138 extending therethrough. The support base 132 has a locking screw 140 installed therein, for use in locking the support base 132 onto a shaft extending through the cylindrical aperture 138.

Referring now to FIGS. 13 and 14, a pulley holding bracket 142 is installed on the end of the boom arm 20. At the end of the pulley holding bracket 142, a shaft 144 is rotatably mounted in a bearing member 146. The shaft 144 extends from both sides of the bearing member 146. The small grooved pulley 112 is mounted (using the locking screw 118) onto the shaft 144 on one side of the bearing member 146. The support base 132 is mounted (using the locking screw 140) onto the shaft 144 on the other side of the bearing member 146.

Referring now to FIG. 14, a microphone suspension assembly 148 is shown installed on the support base 132. The microphone suspension member is preferably as shown in U.S. Pat. No. 4,791,674, to Drever. A microphone 150 of the second type is mounted on the microphone suspension assembly 148. The microphone suspension assembly 148 allows the microphone 150 to be positioned in the same vertical plane as the pulley holding bracket 142, to balance the boom arm 20 to prevent it from tending to rotate to one side. It will be appreciated by those skilled in the art that when the small grooved pulley 112 is rotated, the microphone 150 will be pivoted. Thus, the drive mechanism of FIGS. 1 through 5 may be used to pivot the microphone 150.

Referring now to FIG. 15, the assembled audio/video boom of the present invention as used to hold the microphone 120 of the first type is illustrated. The microphone 120 has a cord 156 attached thereto, which cord 156 is fed into the interior of the boom arm 20 at the end at which the microphone 120 is mounted, with the other end of the cord 156 exiting the boom arm 20 at the other end thereof. The hip belt 98 and the shoulder strap 104 of FIG. 6 are installed on a microphone boom operator 152. The top of the upper mast member 82 is connected to the holding shaft 34, as is the drive apparatus of FIGS. 1 through 3.

The boom arm 20 shown consists of four members 20A, 20B, 20C, and 20D, which telescope in and out of each other. The boom arm 20 shown uses threaded axial locking collars 154 to secure the portions of the boom arm 20 together in a fixed fashion. Such connectors are well known in the art. Instead, a camming locking mechanism (which is also well known in the art) could also be used. Additional arm members could also be added, as by screwing into one end or the other of the boom arm 20. Typically, the boom arm 20 may be 16 to 20 feet in length.

The first and second cables 70 and 72 are used to allow the driving mechanism of FIGS. 1 through 3 to drive the driven mechanism of FIG. 11, as shown, or the driven mechanism of FIG. 14. As described above in conjunction with the discussion of FIG. 3, the lengths of the first and second cables 70 and 72 may be adjusted to compensate for the length of the boom arm 20. The height of the mast may also be adjusted, as described above in conjunction with the discussion of FIG. 6.

Referring now finally to FIGS. 16 through 20, the preferred embodiment of the present invention is illustrated. This embodiment includes a second drive mechanism and a second driven mechanism, which together are utilized to create a tilting movement. Various of the components of this second drive mechanism and the second driven mechanism share common details of construction with the first drive mechanism and the first driven mechanism, respectively, discussed above. Those details will accordingly not be repeated herein.

Figures 16, 19, 20:
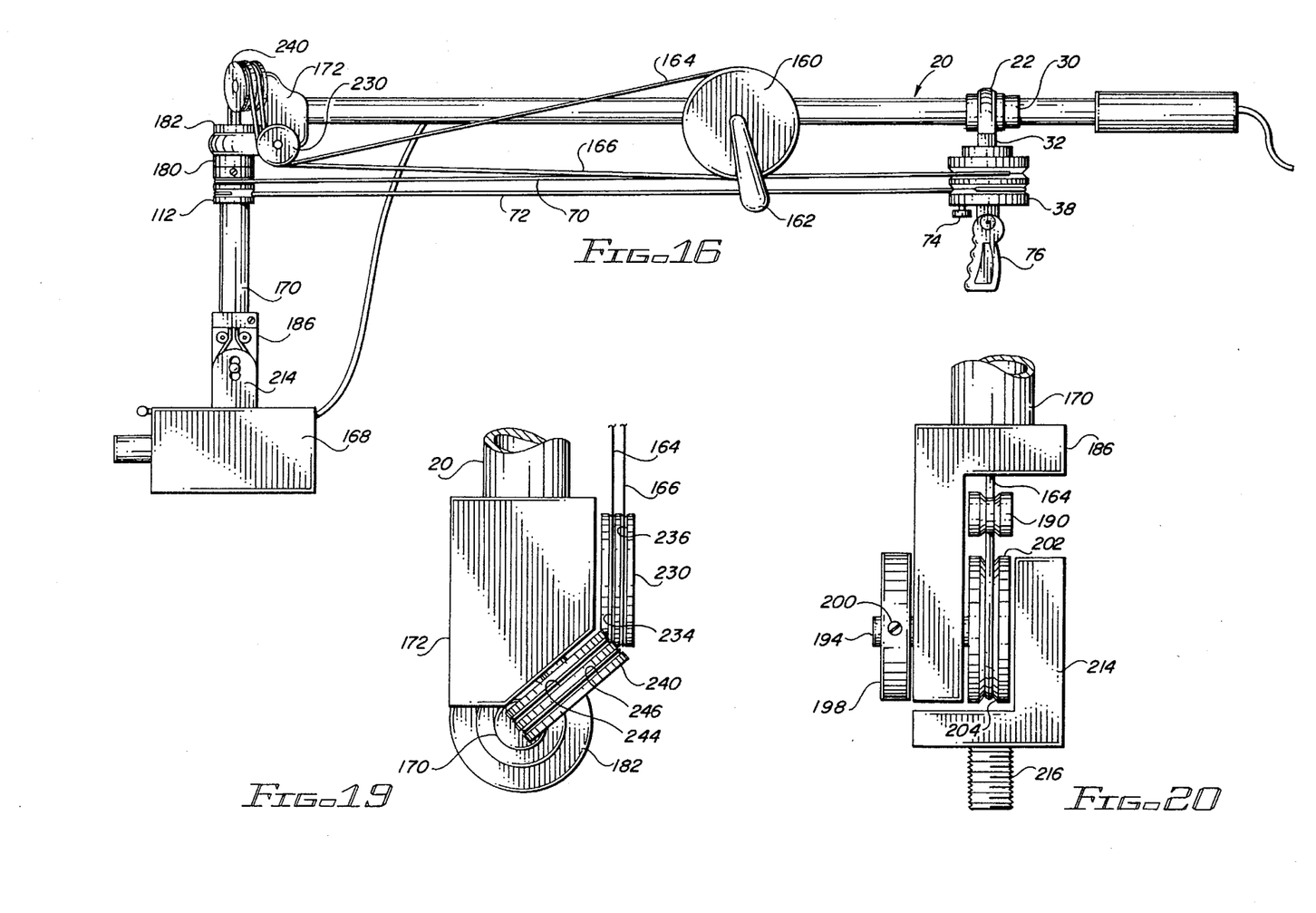
FIG. 16 is a side plan view of the second, tilting drive mechanism in an embodiment which is the heart of the present invention, showing the large grooved pulley which is used to operate two cables, the attachment of the second drive mechanism on a single-segment boom arm, the lever used to operate the second drive mechanism, and the second driven mechanism located at the end of the boom arm, with a video camera being mounted on the boom arm.
FIG. 19 is a top plan view of the second, tilting driven mechanism illustrated in FIGS. 17 and 18, showing in detail the routing of the two cables on the intermediate pulleys and through the top of the hollow drive tube.
FIG. 20 is a front view of the lower portion of the driven mechanism illustrated in FIGS. 17 and 18, showing (together with FIG. 18) in detail the routing of the two drive cables on the idler wheels and onto the small grooved pulley to drive the tilting movement of the mounting bracket.

Referring first to FIG. 16, the first drive mechanism is illustrated installed as has been described hereinabove. A second drive mechanism is illustrated installed on the boom arm 20 intermediate the end of the boom arm 20 on which the driven mechanisms are mounted and the first driving mechanism. The main essential component of the second driven mechanism is a large grooved pulley 160, which in the preferred embodiment is similar in design to the large grooved pulley 38 (FIGS. 1 through 5).

The large grooved pulley 160 in FIG. 16 is illustrated as being mounted on a single segment boom arm 20. In this case, the large grooved pulley 160 need not have the internal construction found within the large grooved pulley 38 (FIGS. 1 through 5). Rather, the large grooved pulley 160 need only be mounted in rotatable fashion on the boom arm 20 as illustrated in FIG. 16. However, if the boom arm 20 is of multiple segment construction as illustrated in FIG. 15, the internal construction of the large grooved pulley 160 would be identical to the internal construction of the large grooved pulley 38.

In either event, the large grooved pulley 160 is mounted on the side of the boom arm 20 in rotatable fashion. A lever 162 is mounted onto the large grooved pulley 160 to facilitate its rotation. A first cable 164 extends from the top of the large grooved pulley 160 toward the end of the boom arm 20 at which the first and second driven mechanisms are mounted. A second cable 166 extends from the bottom of the large grooved pulley 160 toward the end of the boom arm 20 at which the first and second drive mechanisms are mounted.

It will be appreciated that by pushing the lever 162 forward toward the end of the boom arm 20 at which the first and second driven mechanisms are mounted, the first cable 164 will be pulled from the second driven mechanism and wound onto the large grooved pulley 160, while the second cable 166 will be paid out from the large grooved pulley 160. Similarly, by pulling the lever 162 back away from the end of the boom arm 20 at which the first and second driven mechanisms are mounted, the second cable 166 will be pulled from the second driven mechanism and wound onto the large grooved pulley 160, while the first cable 164 will be paid out from the large grooved pulley 160.

A video camera 168 having a microphone thereon is illustrated mounted at the end of the boom arm 20 in FIG. 16. Likewise, one or more microphones (not shown) or another type of camera could also be mounted at the end of the boom arm 20. This will be discussed in more detail below.

Figure 17:
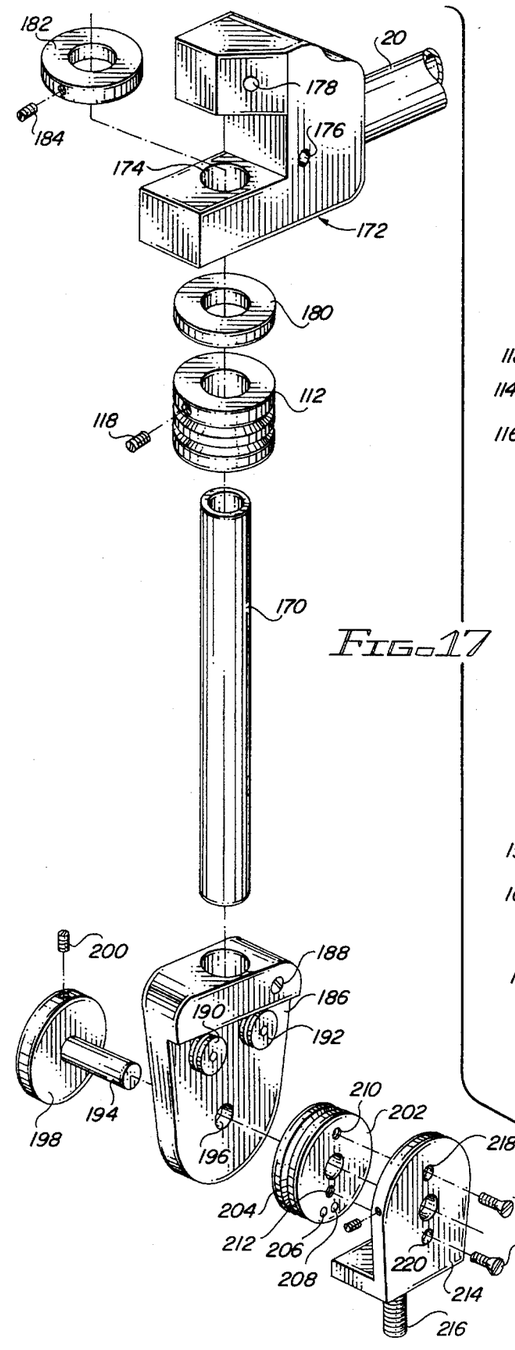
FIG. 17 is an exploded view of the second driven mechanism illustrated in FIG. 16 with the two intermediate pulleys removed for clarity, showing the hollow drive tube through which the two cables from the large grooved pulley are fed to reach the small grooved pulley tilting the mounting bracket.
Figure 18:
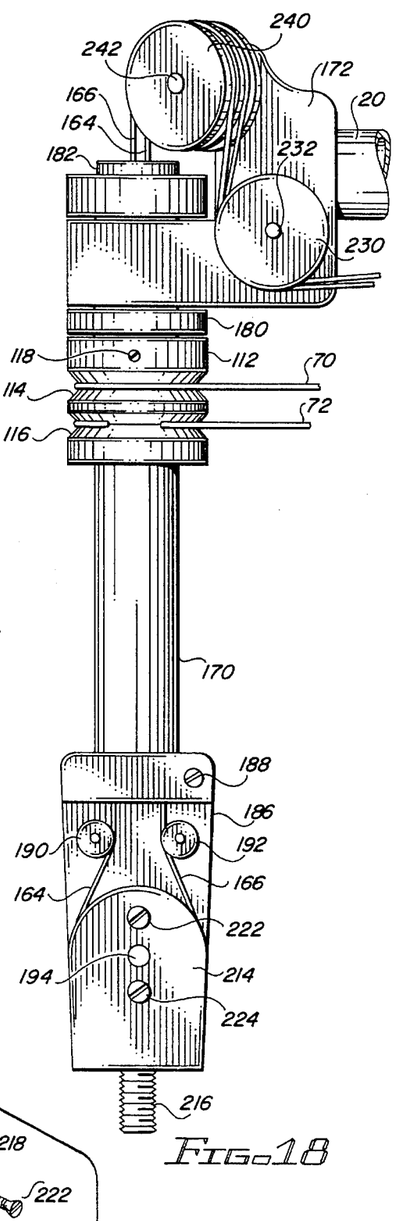
FIG. 18 is an assembled, side plan view of the second, tilting driven mechanism illustrated in FIG. 17, showing the two cables mounted on the intermediate pulleys and being fed through the hollow drive tube, past two idler wheels, and onto the small grooved pulley onto which is mounted the mounting bracket.

Referring next to FIG. 17, the various components of the first and second driven mechanisms are illustrated in exploded format. The first driven mechanism consists merely of the small grooved pulley 112 (as shown in FIGS. 7 through 10). The sole modification to the small grooved pulley 112 is that the aperture therethrough is larger to facilitate mounting on the exterior of a hollow drive tube 170. The small grooved pulley 112 is mounted onto the hollow drive tube 170 using the locking screw 118. The interior of the hollow drive tube 170 itself is sufficiently large to easily accommodate the first cable 164 and the second cable 166, which will extend therethrough, as will become apparent below. The first and second cables 70 and 72 are attached to the small grooved pulley 112 as illustrated hereinabove.

Located at the end of the boom arm 20 and used to support the first and second driven mechanisms is a pulley holding bracket 172. The pulley holding bracket 172 includes a vertically oriented bearing member 174, through which the top end of the hollow drive tube 170 will extend in rotatable fashion. The pulley holding bracket 172 also includes mounting apertures 176 and 178, which will be used to secure a pair of intermediate pulleys to be described below.

As mentioned above, the small grooved pulley 112 is secured onto the hollow drive tube 170, so that rotation of the small grooved pulley 112 will cause the hollow drive tube 170 to rotate in a corresponding manner. Located on the hollow drive tube 170 immediately above the small grooved pulley 112 is an annular spacer 180. The top end of the hollow drive tube 170 is inserted into the bottom of the vertically oriented bearing member 174, and an annular locking collar 182 is placed onto the top end of the hollow drive tube 170. A locking screw 184 is used to retain the annular locking collar 182 in position on the hollow drive tube 170.

A pulley support member 186 having an inverted L-shape (as shown best in FIG. 20) is mounted on the lower end of the hollow drive tube 170, and is secured with a screw 188. Two grooved idler pulleys 190 and 192 are rotatably mounted on the pulley support member 186 below the bottom end of the hollow drive tube 170 when the pulley support member 186 is mounted thereon. It will be appreciated that the first and second cables 164 and 166 will extend from the lowed end of the hollow drive tube 170, and onto the facing sides of the grooved idler pulleys 190 and 192.

A pin 194 extends in rotatable fashion through a horizontally oriented bearing member 196 located in the pulley support member 186 near the bottom thereof. An annular locking collar 198 is mounted onto one end of the pin 194 on the side of the pulley support member 186 opposite the grooved idler pulleys 190 and 192. A locking screw 200 is used to retain the annular locking collar 198 in position on the pin 194.

A small grooved pulley 202 is also mounted onto the pin 194, and is located on the same side of the pulley support member 186 as are the grooved idler pulleys 190 and 192. The small grooved pulley 202 has a single V-shaped circular groove 204 therein, with a pair of apertures 206 and 208 located in the side of the small grooved pulley 202 facing away from the pulley support member 186. The apertures 206 and 208 communicate with the V-shaped circular groove 204 on the bottom thereof as illustrated in FIG. 17, and will be used to retain the ends of the first and second cables 164 and 166 (FIG. 16), respectively, therein.

Also located in the side of the small grooved pulley 202 facing away from the pulley support member 186 are two additional threaded apertures 210 and 212. An L-shaped support base 214 (shown best in FIGS. 17 and 20) is also mounted onto the pin 194 adjacent the side of the small grooved pulley 202 facing away from the pulley support member 186. The L-shaped support base 214 has a threaded stud 216 extending therefrom, which threaded stud 216 may be utilized to mount various cameras (as shown in FIG. 16) and/or microphones (as shown in FIG. 14) therefrom.

The L-shaped support base 214 has a pair of countersunk apertures 218 and 220 located therein. A screw 222 is inserted through the countersunk aperture 218 and into the threaded aperture 210 in the small grooved pulley 202. Likewise, a screw 224 is inserted through the countersunk aperture 220 and into the threaded aperture 212 in the small grooved pulley 202. The screws 222 and 224 retain the L-shaped support base 214 in position on the small grooved pulley 202, and will also be used to retain the ends of the first and second cables 164 and 166 (FIG. 16).

Referring now to all of FIGS. 16 through 20, the final assembly of the second driven mechanism may be described. A first intermediate grooved pulley 230 is mounted in rotatable fashion onto a pin 232, which is inserted into the aperture 176 in the pulley holding bracket 172 (FIG. 17). The first intermediate grooved pulley 230 has two spaced-apart V-shaped circular grooves 234 and 236 therein (best shown in FIG. 19). The first cable 164 will lie on the bottom of the V-shaped circular groove 234, while the second cable 166 will lie on the bottom of the V-shaped circular groove 236.

A second intermediate grooved pulley 240 is mounted in rotatable fashion onto a pin 242, which is inserted into the aperture 178 in the pulley holding bracket 172 (FIG. 17). The second intermediate grooved pulley 240 has two spaced-apart V-shaped circular grooves 244 and 246 therein (best shown in FIG. 19). The first cable 164 will run on the top of the V-shaped circular groove 244, while the second cable 166 will run on the top of the V-shaped circular groove 246.

The path of the first and second cables 164 and 166 may now be briefly described. The first cable 164 starts at the top of the large grooved pulley 160 (FIG. 16), runs under the first intermediate grooved pulley 230 in the V-shaped circular groove 234 (FIGS. 18 and 19), extends over the second intermediate grooved pulley 240 in the V-shaped circular groove 244 (FIGS. 18 and 19), extends down through the hollow drive tube 170 (FIGS. 19 and 20), runs adjacent the grooved idler pulley 190 (FIGS. 18 and 20), extends around the front side of the small grooved pulley 202 in the V-shaped circular groove 204 (FIG. 20), and extends through the aperture 206, where it is retained between the small grooved pulley 202 and the L-shaped support base 214 (FIG. 17).

Likewise, the second cable 166 starts at the bottom of the large grooved pulley 160 (FIG. 16), runs under the first intermediate grooved pulley 230 in the V-shaped circular groove 236 (FIGS. 18 and 19), extends over the second intermediate grooved pulley 240 in the V-shaped circular groove 246 (FIGS. 18 and 19), extends down through the hollow drive tube 170 (FIGS. 19 and 20), runs adjacent the grooved idler pulley 192 (FIG. 18), extends around the back side of the small grooved pulley 202 in the V-shaped circular groove 204, and extends through the aperture 208, where it is retained between the small grooved pulley 202 and the L-shaped support base 214 (FIG. 17).

Returning now to FIG. 16, it will be appreciated by those skilled in the art that when the lever 162 is used to rotate the large grooved pulley 160, movement of the first and second cables 164 and 166 will cause the L-shaped support base 214 to tilt, thereby tilting the video camera 168. Similarly, when the handle 76 is used to rotate the large grooved pulley 38, movement of the first and second cables 70 and 72 will cause the L-shaped support base 214 to pan, thereby panning the video camera 168.

It may therefore be appreciated from the above detailed description of the preferred embodiment of the present invention that it teaches an audio/video boom which can be both carried and operated by a single operator, yet which can be articulated to a degree equaling or exceeding the operation of a production studio boom. The audio/video boom of the present invention provides a degree of rotational or pivotal movement about an axis fixed with respect to the end of the boom on which a camera and/or a microphone is mounted.

This degree of either rotational or pivotal movement by itself allows the audio/video boom of the present invention to be used with either of two different microphone types. In addition, this degree of rotational or pivotal movement is usable in conjunction with axial rotation (twisting) of the boom of the present invention to direct a microphone, which was not possible with a production studio boom. This embodiment which is for use primarily with microphones was the subject of the parent case mentioned above.

The present invention also provides an audio/video boom with a second degree of movement in addition to the first degree of movement mentioned above. This second degree of movement is a degree of tilting movement about an axis fixed with respect to the end of the boom on which a camera and/or a microphone is mounted. The second degree of movement allows a camera and/or a microphone to be simultaneously, independently tilted in addition to the first degree of movement which allows it/them to be panned.

Both panning movement and tilting movement of the camera and/or the microphone at the end of the boom is easy to accomplish and control, and it is implemented with a high degree of precision. The audio/video boom of the present invention is light in weight, and it provides means for supporting the audio/video boom to prevent the operator from having to support by hand the boom of the present invention over an extended period of time. The audio/video boom of the present invention is also of adjustable yet substantial length to support a camera and/or a microphone from a remote location.

The audio/video boom of the present invention operates in a totally silent manner so as not to interfere with sound being recorded. In addition to being lightweight, portable, and easy to operate, the audio/video boom of the present invention is also durable and requires little maintenance, yet is of inexpensive construction to afford it the broadest possible market. Finally, all of the aforesaid advantages and objectives of the present invention are achieved without incurring any substantial relative disadvantage.

Although an exemplary embodiment of the present invention has been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. An audio/video boom for use by an operator to suspend and position an audio/video capturing device, comprising:

a boom arm having a first end and a second end;

first driving means for providing a first mechanical output in response to a first manual input from the operator, second driving means for providing a second mechanical output in response to a second manual input from the operator, first driven means interconnecting said audio/video capturing device and said first end of said boom arm for moving said audio/video capturing device connected thereto in a first degree of movement, said first driven means being coupled to said first mechanical output from said first driving means to cause the audio/video capturing device to move in said first degree of movement in response to said first mechanical output; and second driven means interconnecting said audio/video capturing device and said first end of said boom arm for moving an audio/video capturing device connected thereto in a second degree of movement different from said first degree of movement, said second driven means being coupled to said second mechanical output from said second driving means to cause the audio/video capturing device to move in said second degree of movement in response to said second mechanical output.

2. An audio/video boom for use by an operator to suspend and position an audio/video capturing device, comprising:

a boom arm having a first end and a second end;

first driving means for providing a first mechanical output in response to a first manual input from the operator, said first driving means including a first support member, said first support member of said first driving means being mounted on said boom arm at a first location intermediate said first and second ends of said boom arm;

second driving means for providing a second mechanical output in response to a second manual input from an operator, said second driving means including a second support member, said second support member of said second driving means being mounted on said boom arm at a second location intermediate said first and second ends of said boom arm;

first driven means for moving the audio/video capturing device connected thereto in a first degree of movement, said first driven means being coupled to said first mechanical output from said first driving means to cause the audio/video capturing device to move in said first degree of movement in response to said first mechanical output, said first driven means being mounted at said first end of said boom arm;

second driven means for moving the audio/video capturing device connected thereto in a second degree of movement different from said first degree of movement, said second driven means being coupled to said second mechanical output from said second driving means to cause the audio/video capturing device to move in said second degree of movement in response to said second mechanical output, said second driven means being mounted at said first end of said boom arm; and additionally comprising means for supporting said boom arm from the body of the operator controlling said audio/video boom.

3. An audio/video boom as defined in claim 2, wherein said means for supporting said boom arm comprises:

a harness for installation onto the body of the operator controlling said audio/video boom; and a mast having a first end and a second end, said first end of said mast being supported by said harness, said second end of said mast supporting said boom arm.

4. An audio/video boom as defined in claim 1, including a first support member secured to said first driving member wherein said boom arm is arranged and configured to be freely rotatable with respect to said first support member.

5. An audio/video boom as defined in claim 1, wherein said boom arm comprises:

a plurality of telescoping boom arm sections which are extended or retracted to a working length; and means for locking said boom arm sections together to prevent relative extension or retraction of said boom arm sections.

6. An audio/video boom as defined in claim 1, additionally comprising:

means for maintaining said first and second driving means in relatively fixed longitudinal positions on said boom arm.

7. An audio/video boom as defined in claim 1, wherein said second driving means is secured to said boom arm by a second support member and is located intermediate said first driving means and said first end of said boom arm.

8. An audio/video boom as defined in claim 1, wherein said first driving means comprises:

a first pulley member rotatably mounted on said first driving means; and handle means mounted on said first pulley member for providing said first manual input.

9. An audio/video boom as defined in claim 8, wherein said first driven means comprises:

a first support member mounted at said first end of said boom arm;

a second pulley member secured to a tubular shaft which is rotatably supported in an essentially vertical orientation by said first support member; and mounting means, mounted onto and rotating with said tubular shaft, for holding the audio/video capturing device in a fixed position relative to said mounting means.

10. An audio/video boom as defined in claim 9, wherein said first mechanical output comprises a first pair of cables running between said first and second pulley members, rotation of said first pulley member causing a corresponding rotation of said second pulley member.

11. An audio/video boom as defined in claim 10, additionally comprising means for adjusting the lengths of said first pair of cables.

12. An audio/video boom as defined in claim 11, wherein said means for adjusting the length of said first pair of cables comprises:

a first cable take-up reel rotatably mounted inside said first pulley member; and first spring means for urging said first cable take-up reel to rotate relative to said first pulley member to draw said first pair of cables onto said first cable take-up reel.

13. An audio/video boom as defined in claim 12, further comprising:

first lock means for locking said first pulley member and said first cable take-up reel together to inhibit relative rotation therebetween.

14. An audio/video boom as defined in claim 1, wherein said second driving means comprises:

a third pulley member rotatably mounted on said second driving means; and lever means mounted on said third pulley member for providing said second manual input.

15. An audio/video boom as defined in claim 14, wherein said second driven means comprises:

a first support member mounted at said first end of said boom arm;

a tubular shaft having a top end and a bottom end, said tubular shaft being supported at said top end thereof in an essentially vertical orientation by said first support member;

a second support member mounted at said bottom end of said tubular shaft;

a fourth pulley member rotatable mounted on said second support member in an axis essentially orthogonal to said tubular shaft;

a pair of intermediate pulley members mounted on said first support member; and mounting means, mounted onto and rotating with said fourth pulley, for holding the audio/video capturing device in a fixed position relative to said mounting means.

16. An audio/video boom as defined in claim 15, wherein said second mechanical output comprises a second pair of cables running between said third and fourth pulley members via said pair of intermediate pulley members, rotation of said third pulley member causing a corresponding rotation of said fourth pulley member.

17. An audio/video boom as defined in claim 16, additionally comprising means for adjusting the lengths of said second pair of cables.

18. An audio/video boom as defined in claim 17, wherein said means for adjusting the length of said second pair of cables comprises:

a second cable take-up reel rotatably mounted inside said third pulley member; and second spring means for urging said second cable take-up reel to rotate relative to said third pulley member to draw said second pair of cables onto said second cable take-up reel.

19. An audio/video boom as defined in claim 18, further comprising:

first lock means for locking said third pulley member and said second cable take-up reel together to inhibit relative rotation therebetween.

20. An audio/video boom as defined in claim 1, wherein said first degree of movement comprises:

panning said audio/video device in a horizontal plane about a first axis of rotation; and wherein said second degree of movement comprises:

tilting said audio/video device in a vertical plane about a second axis of rotation.

21. An audio/video boom as defined in claim 1, wherein said first and second degrees of movement are in essentially orthogonal directions relative to each other.

22. An audio/video boom for use by an operator to suspend and position an audio/video capturing device, comprising:

a boom arm having a first end and a second end;

first driving means for operating a first pair of cables to move in opposite directions to each other in response to a first manual input from the operator, said first driving means being mounted on said boom arm at a first location intermediate said first and second ends of said boom arm;

second driving means for operating a second pair of cables to move in opposite directions to each other in response to a second manual input from said operator, said second driving means being mounted on said boom arm at a second location intermediate said first and second ends of said boom arm;

first driven means for moving said audio/video capturing device connected thereto in a first degree of movement, said first driven means being operatively connected to both of said first pair of cables to cause the audio/video capturing device to move in response to said first mechanical output in said first degree of movement, said first driven means being mounted between said boom arm and said audio/video capturing device; and second driven means for moving said audio/video capturing device connected thereto in a second degree of movement different from said first degree of movement, said second driven means being operatively connected to both of said second pair of cables to cause said audio/video capturing device to move in response to said second mechanical output in said second degree of movement, said second driven means being mounted between said boom arm and said audio/video capturing device.

23. An audio/video boom for use by an operator to suspend and position an audio/video capturing device, comprising:

a boom arm having a first end and a second end;

first driving means for receiving a first manual input from an operator, said first driving means being mounted on said boom arm at a first location intermediate said first and second ends of said boom arm;

second driving means for receiving a second manual input from the operator, said second driving means being mounted on said boom arm at a second location intermediate said first and second ends of said boom arm;

first driven means for moving said audio/video capturing device connected thereto in a first degree of movement, said first driven means being mechanically connected to be driven in said first degree of movement by said first driving means, said first driven means being mounted between said boom arm and said audio/video capturing device; and second driven means for moving said audio/video capturing device connected thereto in a second degree of movement different from said first degree of movement, said second driven means being mechanically connected to be driven in said second degree of movement by said second driving means, said second driven means being mounted between said boom arm and said audio/video capturing device.

24. A method of suspending and positioning an audio/video capturing device, comprising:

manipulating a first driving apparatus to provide a first mechanical output in response to a first manual input from an operator, said first driving apparatus including a first support member, said first support member of said first driving apparatus being mounted on a boom arm having first and second ends thereof at a location intermediate said first and second ends of said boom arm, said first supporting apparatus being mechanically coupled to said first support member of said driving apparatus, the audio/video capturing device being connected to a first driven apparatus, said first driven apparatus being coupled to said first mechanical output from said first driving apparatus to cause said first driven apparatus and the audio/video capturing device to move in a first degree of movement in response to said first mechanical output when said first driving means is manipulated, said first driven apparatus being mounted between said boom arm and the audio/video capturing device; and manipulating a second driving apparatus to provide a second mechanical output in response to a second manual input from the operator, said second driving apparatus including a second support member, said second support member of said second driving apparatus being mounted on said boom arm at a location intermediate said first and second ends of said boom arm, said second supporting apparatus being mechanically coupled to said second support member of said driving apparatus, the audio/video capturing device being connected to a second driven apparatus, said second driven apparatus being coupled to said second mechanical output from said second driving apparatus to cause said second driven apparatus and the audio/video capturing device to move in a second degree of movement different from said first degree of movement in response to said second mechanical output when said second driving means is manipulated, said second driven apparatus being mounted between the boom arm and said audio/video capturing device.

* * * * *